Patented Dec. 8, 1925.

1,565,229

UNITED STATES PATENT OFFICE.

GEORG KALISCHER, OF MAINKUR, NEAR FRANKFORT-ON-THE-MAIN, AND RUDOLF MÜLLER AND FRITZ FRISTER, OF FECHENHEIM, NEAR FRANKFORT-ON-THE-MAIN, GERMANY, ASSIGNORS TO LEOPOLD CASSELLA & CO. GESELLSCHAFT MIT BESCHRÄNKTER HAFTUNG, A CORPORATION OF GERMANY.

PROCESS FOR THE PRODUCTION OF BENZANTHRONE DERIVATIVES.

No Drawing.    Application filed March 19, 1925. Serial No. 16,795.

*To all whom it may concern:*

Be it known that we, GEORG KALISCHER, a citizen of the German Republic, residing at Mainkur, near Frankfort-on-the-Main, Germany, RUDOLF MÜLLER, a citizen of the German Republic, residing at Fechenheim, near Frankfort-on-the-Main, Germany, and FRITZ FRISTER, a citizen of the German Republic, residing at Fechenheim, near Frankfort-on-the-Main, Germany, have invented a Process for the Production of Benzanthrone Derivatives, of which the following is a full description.

We have found that benzanthrone derivatives may be obtained according to a new process entirely different from any one used hitherto and which consists in reducing α-naphthalene-azo-benzene-m-carboxylic acid or the substitution products thereof to the hydrazo-compounds, in transforming the α-naphthalene-hydrazo-benzene-m-carboxylic acids thus obtained in acid solution into the 4.4¹-diaminonaphthylphenyl-2¹-carboxylic acids and in condensing the latter by means of acid condensing agents to benzanthrone derivatives. The different phases of the reaction may be represented by the following formulæ, α-naphthalene-azo-benzene-m-carboxylic acid being used as prototype for the whole class:

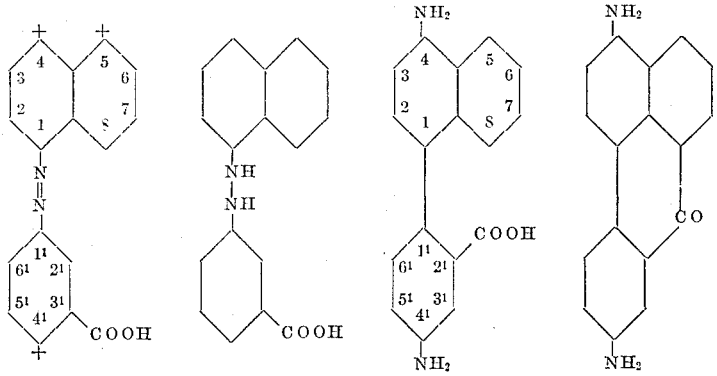

The α-naphthalene-azo-m-carboxylic acid or its substitution products serving as starting materials for the new process may be obtained by boiling with alcohol the diazocompounds of the azo dyes, which are formed by combining diazobenzene-m-carboxylic acid with α-naphthylamine or its derivatives. Generally speaking only those derivatives of α-naphthalene-azo-benzene-m-carboxylic acid can be used for the new process, in which the ana-5-position corresponding to the azo group of the naphthalene nucleus and the two p-positions to the azo-group (the C-atoms marked in the first formula by a+) are not substituted.

The reduction of the azocompounds may be effected with all the reducing agents used hitherto for this reaction, i. e. stannouschloride, sulfurous acid, zinc dust etc. The reduction and the transformation of the hydrazocompounds thus obtained may be with great advantage carried out in one operation by working in a mineral acid solution.

The 4-4¹-diaminonaphthylphenyl-2-carboxylic acid or its substitution products can best be condensed into the corresponding benzanthrone derivatives by means of acid condensing agents such as sulfuric acid, chloro-sulfonic acid, chloride of zinc, etc. The formation of the closed chain may also be effected by converting the acids at first into the chlorides and by treating the latter with aluminium chloride.

The benzanthrone derivatives thus obtained are valuable intermediate products for the production of vat dyestuffs of the violanthrone and isoviolanthrone series. In order to illustrate our present invention we give the following examples:

*Example 1.—4.4¹-diaminonaphthylphenyl-2¹-carboxylic acid.*

A suspension of 48 kg. of the sodium salt of the α-naphthalene-azo-benzene-m-carboxylic acid in 200 kg. alcohol is allowed to run within ½ hour at 50° into a solution of 112 kg. stannous chloride in 360 kg. concentrated hydrochloric acid, the temperature being kept below 60°. In order to ensure complete transformation, the solution is stirred for some time at 50° and the reaction product is then separated by filtration. For purifying the dihydrochloride of the 4.4$^1$-diaminonaphthylphenyl-2$^1$ carboxylic acid thus obtained, the raw product is dissolved in hot water and separated again as a light grey sediment by the addition of concentrated hydrochloric acid. By addition of the calculated amount of alkali, the free diaminonaphthylphenylcarboxylic acid, which is sparingly soluble in water, is precipitated, whereas with an excess of alkali the easily soluble sodium salt is formed. By the action of nitrous acid an easily soluble golden yellow tetrazocompound is obtained, which yields with R-salt a violet dyestuff.

The α-naphthalene-azo-benzol-m-carboxylic acid required for the process may be obtained by boiling the diazo compound of the dyestuff from m-diazobenzoic acid and α-naphthylamine with alcohol.

The α-naphthalene-azo-benzol-m-carboxylic acid crystallizes from glacial acetic acid in yellow-brown needles of F. P. 207° and yields a sodium salt sparingly soluble in hot water.

*Example 2.—Diaminobenzanthrone.*

20 kg. of the hydrodi-chloride obtained according to Example 1 are gradually added to 140 kg. of chlorosulfonic acid at a temperature not exceeding 10°. The condensation commences at once and is complete after stirring for 1 hour at 10°. The separation of the diaminobenzanthrone is effected by allowing the reaction-mixture to flow on an excess of ice and transforming the separating sparingly soluble sulfate into the free base by the addition of alkali. The diaminobenzanthrone thus obtained, of the formula:

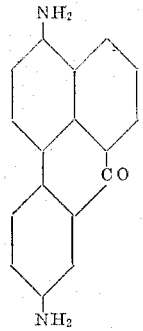

is a dark violet powder which is insoluble in water and is forming with sulfuric acid in aqueous solution a difficultly soluble sulfate. It dissolves in organic solvents with a violet color, and has if re-crystallized from these solvents a melting point of about 225° C. With concentrated sulfuric acid a yellow brown green-fluorescent solution is formed. By means of nitrous acid a tetrazo body is obtained soluble in water with a brownish yellow color and yielding with R-salt a blue disazo dyestuff.

*Example 3.—4.4$^1$ diaminonaphthyl-5$^1$-methylbenzol-2$^1$-carboxylic acid.*

Into a suspension of 15 kg. of finely ground α-naphthalene-azo-2-methylbenzol-m-carboxylic acid of the formula:

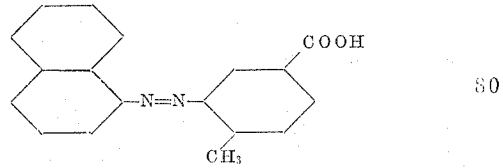

to which a solution of 0.2 kg. potassium iodide, in 90 kg. concentrated hydrochloric acid has been added, sulfurous acid is introduced in a slow current at a temperature of 25–30°, while stirring continually, until the azo compound has disappeared and the transformation is complete which is the case after 5–6 hours.

The precipitated sulfate of the 4.4$^1$-diamino naphthyl-5$^1$-methylbenzol-2$^1$-carboxylic acid is separated as indicated in Example 1 and shows properties very similar to the compound described therein. The reduction and transformation may likewise be effected in a closed vessel by passing the sulfurous acid into the reaction-mixture.

The α-naphthalene-azo-methylbenzol-m-carboxylic acid employed in this example is obtained from the azo dyestuff from diazotised-3-amino-4-methylbenzol-1-carboxylic acid and α-naphthylamine; after re-crystallizing from glacial acetic acid it is obtained in the form of brown-yellow crystals of F. P. 226°.

*Example 4.—Diaminomethylbenzanthrone.*

10 kg. of the sulfate obtained according to Example 3 are gradually added to 150 kg. monohydrate in order to prevent the temperature from rising above 30°. After stirring for 1 hour, the whole is poured on ice, and rendered alkaline with caustic soda solution. The diaminomethylbenzanthrone of the formula:

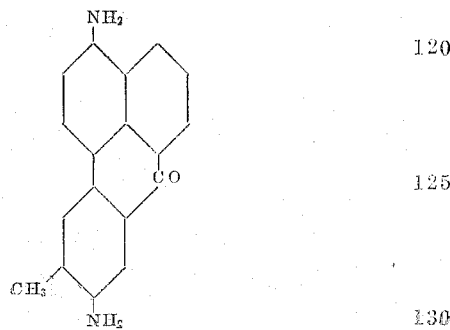

which has separated in the form of blue flakes is filtered off. For purifying the same it is re-precipitated from a solution in dilute hydrochloric acid, and then if necessary recrystallized from solvents of a high boiling point. The diaminomethylbenzanthrone has exactly the same properties as its lower homologue obtained according to Example 2. The condensation to the bezanthrone derivative is also easily effected by heating with other condensing agents, for instance with zinc chloride at 120°. Condensation may also be combined with reduction and transformation in one operation, by adding the necessary quantity of aluminium bronze to the solution of the azo body in concentrated sulfuric acid.

*Example 5.—Diaminomethoxybenzanthrone.*

The azo-compound of the formula:

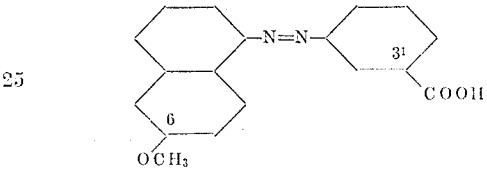

obtained from the monoazo dyestuff of m-diazobenzoic acid and 1-amino-7-methoxynaphthalene, by elimination of the amino groups, is converted into the 4.4¹-diamino-7-methoxynaphthyl-phenyl-2¹-carboxylic acid of the formula:

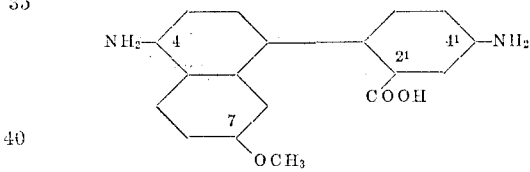

according to the process described in Example 1 by reduction with stannous chloride and simultaneous transformation. This compound, which is in its properties analogous to the 4.4¹-diaminonaphthylphenyl-2¹-carboxylic acid described in Example 1, may be converted by acid condensing agents, as for instance by slightly heating the same with 5 times the quantity of chlorosulfonic acid, as described in Example 2, into the diamine methoxybenzanthrone possessing the formula:

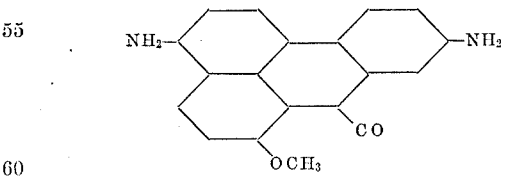

This compound has nearly the same properties as the product obtained according to Example 2. Its solution in glacial acetic acid, pyridine and the like is dyed blood-red. The solution in concentrated sulfuric acid is green-yellow with a strong green fluorescence. By means of nitrous acid a brown colored tetrazo body is obtained yielding with R-salt a blue disazo dyestuff.

In exactly the same manner a benzanthrone derivative is obtained from the monoazo dyestuff from m-diazobenzoic acid and 1-amino-7-chlornaphthalene, of the constitution:

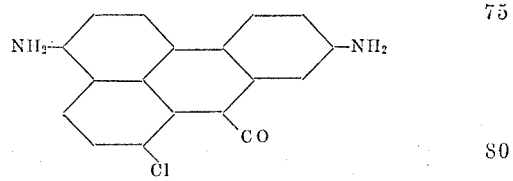

which dissolves in concentrated sulfuric acid with an orange shade, slightly fluorescent, and in organic solvents as for instance aniline, with a magenta-red color, and forming by tetrazotizing in the usual manner a brownish olive colored tetrazo compound yielding with R-salt a blue disazo dyestuff.

Having now particularly described and ascertained the nature of our said invention and in what manner the same is to be performed, we declare that what we claim is:—

1. Process for the production of benzanthrone derivatives which consists in treating α-naphthalene-azo-benzene-m-carboxylic acids (in which the C-atoms 4, 5, and 4¹ corresponding to the following formula:

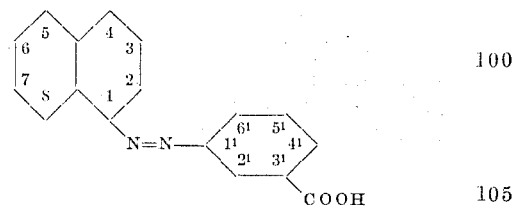

are not substituted) with reducing agents in an acid solution, and condensing the diaminonaphthylphenyl-o-carboxylic acids thus obtained and represented by the following general formula:

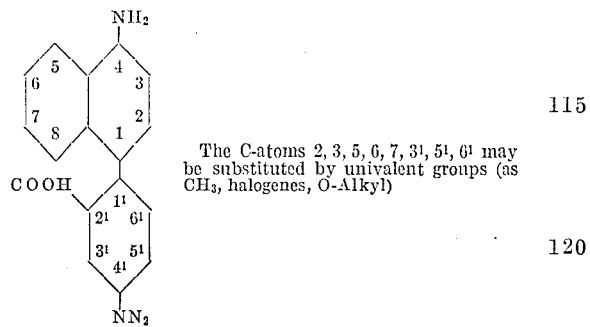

The C-atoms 2, 3, 5, 6, 7, 3¹, 5¹, 6¹ may be substituted by univalent groups (as CH₃, halogenes, O-Alkyl)

with acid condensing agents substantially as described.

2. Process for the production of diaminobenzanthrone which consists in treating α-naphthalene-azo-benzene-m-carboxylic acid with reducing agents in an acid solution and condensing the diaminonaphthylphenyl-o- carboxylic acid thus obtained and represented by the following formula:

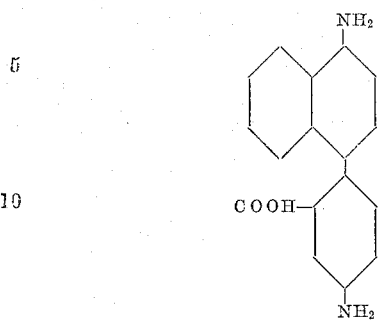

with acid condensing agents substantially as described.

3. As new articles of manufacture the 4.4¹-diaminobenzanthrones produced according to claim 1 of the following formula:

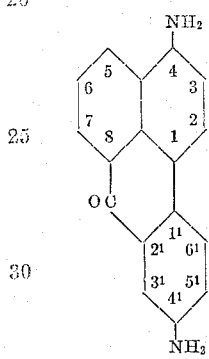

The C-atoms 2, 3, 5, 6, 7, 3¹, 5¹, 6¹ may be substituted by univalent groups (as CH₂, Halogenes, O-Alkyl)

these 4.4¹ diamino benzanthrone derivatives being dark violet powders soluble in organic solvents, yielding with concentrated sulfuric acid yellow to brown solutions with a significant fluorescence, forming with sulfuric acid in aqueous solution rather difficultly soluble salts, and the terrazo bodies thereof being soluble in water with a yellow to brown color and yielding with R-salt violet to blue disazo dyestuffs.

4. As new article of manufacture the 4.4¹ diamino benzanthrone prepared according to claim 2 of the following formula:

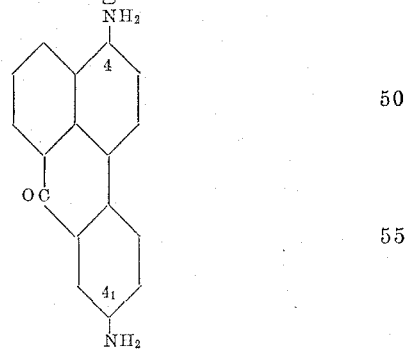

being a dark violet powder insoluble in water, having in a pure state a melting point of about 225° C., dissolving in organic solvents with a dark violet color, yielding with concentrated sulfuric acid a yellow-brown colored green fluorescent solution, forming with sulfuric acid in aqueous solution a difficultly soluble sulfate, the tetrazo body thereof being soluble in water with a brownish-orange color and yielding with R-salt a violet-blue disazo dyestuff.

In witness whereof they have hereunto signed their names this third day of March 1925.

GEORG KALISCHER.
RUDOLF MÜLLER.
FRITZ FRISTER.